United States Patent
Kempf et al.

(10) Patent No.: US 12,423,168 B2
(45) Date of Patent: Sep. 23, 2025

(54) METHOD FOR CREATING AN APP-CAPABLE BASIC SYSTEM AND A MATCHING APP

(71) Applicant: Endress+Hauser Conducta GmbH+Co. KG, Gerlingen (DE)

(72) Inventors: Stefan Kempf, Kornwestheim (DE); Stefan Robl, Hünxe (DE)

(73) Assignee: Endress+Hauser Conducta GmbH+Co. KG, Gerlingen (DE)

( * ) Notice: Subject to any disclaimer, the term of this patent is extended or adjusted under 35 U.S.C. 154(b) by 219 days.

(21) Appl. No.: 18/067,046

(22) Filed: Dec. 16, 2022

(65) Prior Publication Data
US 2023/0195549 A1    Jun. 22, 2023

(30) Foreign Application Priority Data
Dec. 16, 2021 (DE) ............ 10 2021 133 557.4

(51) Int. Cl.
*G06F 9/54* (2006.01)
*G06F 8/41* (2018.01)

(52) U.S. Cl.
CPC ............ *G06F 9/547* (2013.01); *G06F 8/436* (2013.01); *G05B 2219/33282* (2013.01)

(58) Field of Classification Search
CPC ............ G05B 2219/33282; G06F 8/436; G06F 9/547
USPC ............................................ 709/201
See application file for complete search history.

(56) References Cited

U.S. PATENT DOCUMENTS

| | | | |
|---|---|---|---|
| 7,467,392 B1* | 12/2008 | Ludwig | G06F 9/4411 710/19 |
| 10,982,983 B2* | 4/2021 | Robl | G06F 15/04 |
| 2012/0144376 A1* | 6/2012 | Van Eijndhoven | G06F 8/456 717/146 |
| 2014/0208100 A1* | 7/2014 | Kendall | G06F 21/6281 713/187 |
| 2015/0339133 A1* | 11/2015 | Haenger | H04M 1/72412 455/414.1 |
| 2020/0183708 A1* | 6/2020 | Robl | G06F 9/45504 |
| 2020/0213265 A1* | 7/2020 | Deshpande | H04L 61/58 |
| 2021/0049005 A1* | 2/2021 | Yehuda | G06F 9/44526 |

(Continued)

FOREIGN PATENT DOCUMENTS

CN    113762779 A    12/2021

*Primary Examiner* — David P Zarka
(74) *Attorney, Agent, or Firm* — Kelly J. Smith; Endress+Hauser (USA) Holding, Inc.

(57) ABSTRACT

The present disclosure discloses a method for creating an app-capable basic system, such as an app-capable measuring transducer or an app-capable sensor, and a matching app, comprising the steps of: creating one or more interface methods with their name and version that the basic system expects from the app; creating one or more system calls with their name and version that the basic system offers the app; checking the interface methods and system calls for syntactic and semantic correctness; creating interface stubs for the basic system using the interface methods; creating system call stubs for the app using the system calls; creating the basic system by means of the system calls and interface stubs; and creating the app by means of the interface methods and the system call stubs.

12 Claims, 11 Drawing Sheets

(56) References Cited

U.S. PATENT DOCUMENTS

2023/0195447 A1\*  6/2023  Kempf ..................... G06F 8/65
                                                   717/169
2023/0222013 A1\*  7/2023  Kempf ................. G06Q 50/00
                                                   719/328
2024/0053995 A1\*  2/2024  Kempf ................... G06F 9/451

\* cited by examiner

22 ⟶

> name: mySensor
> version: 1.0
> methods:
> 
> — signature: void Foo (int a)
>   timeBudget: 100ms
>   id: 1
> — signature: void Bar (int & ret)
>   id: 2

FIG. 4

24a ⟶ group: CThreadControl
version: 1.0
id: 1
methods:

— signature: void Yield ()
  id: 1 group: CIndexStructureAccess
version: 2.3
id: 2
methods:

— signature: void * Begin (uint8 indexNr, uint16 indexSize)
  id: 1
— signature: void   End(uint8 indexNr, uint8 dataWasChanged)
  id: 2

FIG. 5

```
manufacturer: Endress+Hauser          # The company that created this plugin
description:   "Model for a XY sensor"  # A short description what the plugin does
timestampUTCMs: 12345                 # Creation date of the plugin
friendlyName: Formazine               # A non-unique human-readable name for the plugin
uniqueName: sensorXY formazine        # A unique machine-processable name of the plugin
sofewareClass: classXYZ               # The type of sensor the plugin was developed for
heapSize: 1234                        # The amount of heap needed by the plugin
stackSize: 5678                       # The amount of stack needed by the plugin
version: 1.0.0                        # The version number of the plugin
depends:                              # Interfaces/components that the plugin depends on
    - component: plugin_abi
      version: 0.1
    - component: syscall_abi
      version: 0.1
    - component: "syscalls/CThreadControl"
      version: 1.0
    - component: "syscalls/CIndexStructureAccess"
      version: 2.1
    - component: index_structure
      version: 3.0.0
    - component: something_sensor_specific
      version: 4.4
provides:                             # Interfaces provided by the plugin
    - component: plugin_interface
      version: 1.1
```

FIG. 6

METHOD FOR CREATING AN APP-CAPABLE BASIC SYSTEM AND A MATCHING APP

CROSS-REFERENCE TO RELATED APPLICATION

The present application is related to and claims the priority benefit of German Patent Application No. 10 2021 133 557.4, filed on Dec. 16, 2021, the entire contents of which are incorporated herein by reference.

TECHNICAL FIELD

The present disclosure relates to a method for creating an app-capable basic system, such as an app-capable measuring transducer or an app-capable sensor, and a matching app. The present disclosure also relates to a measuring transducer and a sensor for executing the method.

BACKGROUND

The problem addressed by the present disclosure will first be explained with reference to the design of the basic system as a sensor.

Sensors, primarily optical sensors, detect physical parameters (raw values, frequently as a voltage value) and calculate measured values relevant for the application therefrom. One example is the calculation of the fat content in milk using the light spectrum of the milk. Another example is the determination of the concentration of a specific substance using the conductivity of the measurement medium. The algorithms responsible for converting raw values into measured values are referred to as (computing) models.

The models in the sensors cannot be arbitrarily supplemented or even replaced. The sensor includes either just one set of models permanently installed in the firmware (or only a single model), wherein the permanently integrated models can at best be parameterized.

Sensors often support more applications than originally intended in terms of their technical data acquisition possibilities. For example, a turbidity sensor which was actually developed for the measurement of sludges in the field of wastewater would also be able to measure fat content in milk by using the measurement principle. However, since the model for determining the fat content is only able to render the sensor capable of measuring it through a complex firmware update, the sensor can only be used for the originally intended application. This holds true since, in certain applications, an associated model must be adapted specifically to the specific operating environment at the end user, which would require high flexibility of the model update.

The problem can also be transferred to the embodiment of a basic system as a measuring transducer (a measuring transducer is often also called transmitter). Given the architecture, memory, microprocessor, etc., a measuring transducer is also in principle capable of "more" than is stored in the firmware at the time of delivery. At a later point in time, it is desirable to provide additional functions.

It is desirable for future developments to also be supported, and for the development process to take place in the simplest possible manner.

SUMMARY

The present disclosure is based on the object of expanding the functional scope of a basic system in a simple manner, i.e. providing new functionality without requiring a comprehensive firmware update.

The present disclosure is directed to a method for creating an app-capable basic system, such as an app-capable measuring transducer or an app-capable sensor, and a matching app, comprising the steps of: creating one or more interface methods with their name and version that the basic system expects from the app; creating one or more system calls with their name and version that the basic system offers the app; checking the interface methods and system calls for syntactic and semantic correctness; creating interface stubs for the basic system using the interface methods; creating system call stubs for the app using the system calls; creating the basic system by means of the system calls and interface stubs; and creating the app by means of the interface methods and the system call stubs.

In the following, the term "app" is used synonymously with the term "plugin" and is a downloadable program code which brings a useful functionality. Furthermore, the term "basic system" is used synonymously with "host". This includes the firmware of the basic system. This is a measuring transducer or a sensor in which the app is executed.

The basic system must load an app before its execution. The claimed idea makes it possible for the basic system to load only the apps that were also written for the basic system; for example: a measuring transducer should not load an app written for a sensor.

In particular in the steps "creating interface stubs for the basic system using the interface methods" and "creating system call stubs for the app using the system calls", the situation is such that the system calls are executed only once, as long as their version does not change.

One embodiment provides that, before the steps "creating interface stubs for the basic system using the interface methods", and "creating system call stubs for the app using the system calls", the following step is carried out: creating a stub template set for the particular basic system-app combination, wherein the steps "creating interface stubs for the basic system using the interface methods" and "creating system call stubs for the app using the system calls" are performed via the stub template set of the basic system-app combination.

One embodiment provides that, after performing the steps "creating one or more interface methods with their name and version that the basic system expects from the app", and "creating one or more system calls with their name and version which the basic system offers the app", it is checked in each case whether the new versions to be created are compatible with the previous version.

One embodiment provides that the steps "creating the basic system by means of the system calls and interface stubs", and "creating the app by means of the interface methods and the system call stubs" take place by an automated process.

One embodiment provides that the app comprises at least program code and metainformation, the program code comprising a main logic, the interface methods which are called by the basic system, and the system call stubs, by means of which functions in the basic system are called, the metainformation comprising at least the name and version of the app, the target system of the app, the name and version of expected system calls, and the name and version of offered interface methods.

One embodiment provides that the metainformation comprises: maximum memory requirement of the app, required memory requirement of the app, required computation requirement of the app, time budget of the interface method, or properties of the basic system that the app expects from the basic system such as the presence of peripheral devices or terminals, such as a display, control buttons, Ethernet, Bluetooth, inter alia.

One embodiment provides that the method comprises the step: returning at least one return value from the app to the basic system, such as for the interface method; and/or returning at least one return value from the basic system to the app, such as via the system calls.

One embodiment provides that the basic system comprises a plurality of apps.

One embodiment provides that the basic system is a sensor, and wherein the app is an app for calculating a measured value using a model, wherein the sensor transmits the raw value as a parameter to the app, or the app retrieves the raw value via a programming interface API, wherein the main logic comprises algorithms for signal processing and routines for calculating the measured value from a raw value using the model, and wherein the measured value is a return value.

The object is further achieved by a sensor for carrying out the method as described above, comprising a sensor element for detecting a measurand of a measurement medium, and a data processing unit with a memory.

One embodiment provides that the sensor is designed as an optical sensor with a light source and a light receiver; the sensor is a spectrometer.

One embodiment provides that the sensor is designed for detecting boundary layers, such as a sludge level sensor, or the fill level, with a transmitter for transmitting electromagnetic waves, light, such as optical light, acoustic waves, or ultrasound in the direction of the boundary layer or the surface, and with a receiver for receiving the returned waves or light.

One embodiment provides that the sensor is designed as a two-dimensional optical sensor, such as for particle or bacterial counts.

One embodiment provides that the sensor is designed as a three-dimensional optical sensor, such as a lidar sensor.

The present disclosure further discloses a measuring transducer for carrying out the method as described above, comprising a data processing unit with a memory.

BRIEF DESCRIPTION OF THE DRAWINGS

This is explained in more detail with reference to the following figures.

FIG. 4 shows a specification for an interface method.

FIG. 5 shows a specification for a system call.

FIG. 6 shows metainformation.

In the figures, the same features are labeled with the same reference signs.

DETAILED DESCRIPTION

Figure 1:
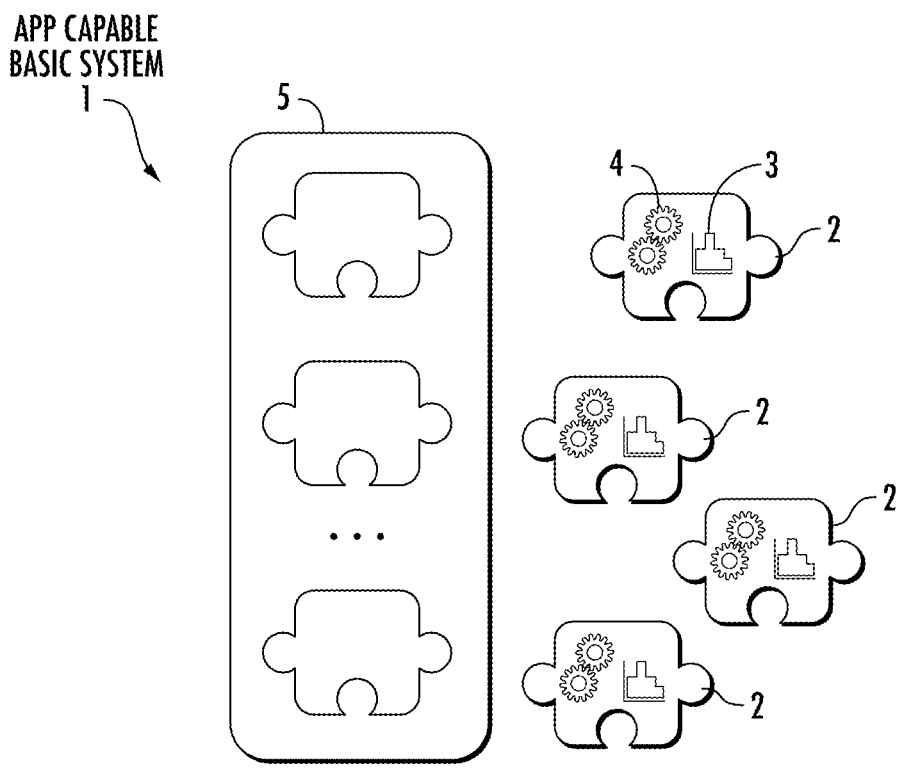
FIG. 1 shows several apps in the basic system.

FIG. 1 shows parts of an app-capable basic system 1 with downloadable apps 2, for example with completely freely definable signal processing 3, i.e. models, and parameterization 4. The basic system 1 comprises a data processing unit 14 with a memory 5 that is large enough to store a plurality of apps 2 (symbolized by the free areas). FIG. 1 symbolically shows the memory 5 with apps 2.

The app 2 is therefore a (down)loadable piece of program code which offers additional functions to the host, i.e. the basic system 1. The loadable code is structured to interact with the basic system 1 at two ends. There are one or more interface methods 22 in the app 2 that calls the basic system 1 to retrieve a certain functionality in the app 2; example: calculation of measured values, see below. The basic system 1 provides functions via one or more system calls 24*a* that are retrieved via system call stubs 24 within the app 2; example: access to data structures, sensor parameters, sensor configuration or expanded computing methods.

The execution of the app 2 is denied if the system calls 24*a* or interface methods 22 are not present, or are present only in an incompatible version, or the target system does not correspond, i.e. the app 2 was written for an incorrect basic system 1. The app 2 is terminated if it tries to execute during runtime a system call 24*a* that is not present in the basic system 1 or is present in an incompatible version.

The firmware of the basic system 1 is designed in such a way that it can receive apps 2 via an interface and store them internally. The basic system 1 offers a communication interface 6, via which the basic system 1 is told which of the stored app(s) 2 are to be loaded, for example for calculating the measured value. The basic system 1 is connected to a higher-level unit via the communication interface 6. The communication interface 6 is usually connected by wire and can be subject to a proprietary protocol or a bus system such as HART, Modbus, Foundation Fieldbus, or the like.

In the following, the app-capable basic system will be discussed first. The basic system 1 can be designed as a sensor 1*a* or as a measuring transducer 1*b*. In the following, the embodiment of the basic system 1 as sensor 1*a* will initially be addressed with reference to FIG. 2*a*, while FIG. 2*b-d* show the embodiment of the basic system 1 as a measuring transducer 1*b*.

The sensor 1*a* comprises at least one light source 11, a spectrometer 13 and a data processing unit 14. The sensor 1 and the data processing unit 14 are designed to run the steps of the claimed method, therefore to run the app 2. Furthermore, the data processing unit 14 can control and regulate sensor-specific tasks such as for example turn the light source 11 on and off, or carry out the data processing. In this embodiment, it should be mentioned that the raw values of the sensor 1*a* are converted to measured values using a model.

An optical sensor, more precisely a spectrometer, is shown. This is explained in more detail below. In principle, however, the claimed method can also be applied to other sensors with other physical or chemical measuring methods. The spectrometer is designed to determine a concentration of one or more substances, or to determine the fat content of a medium.

Figure 2A:
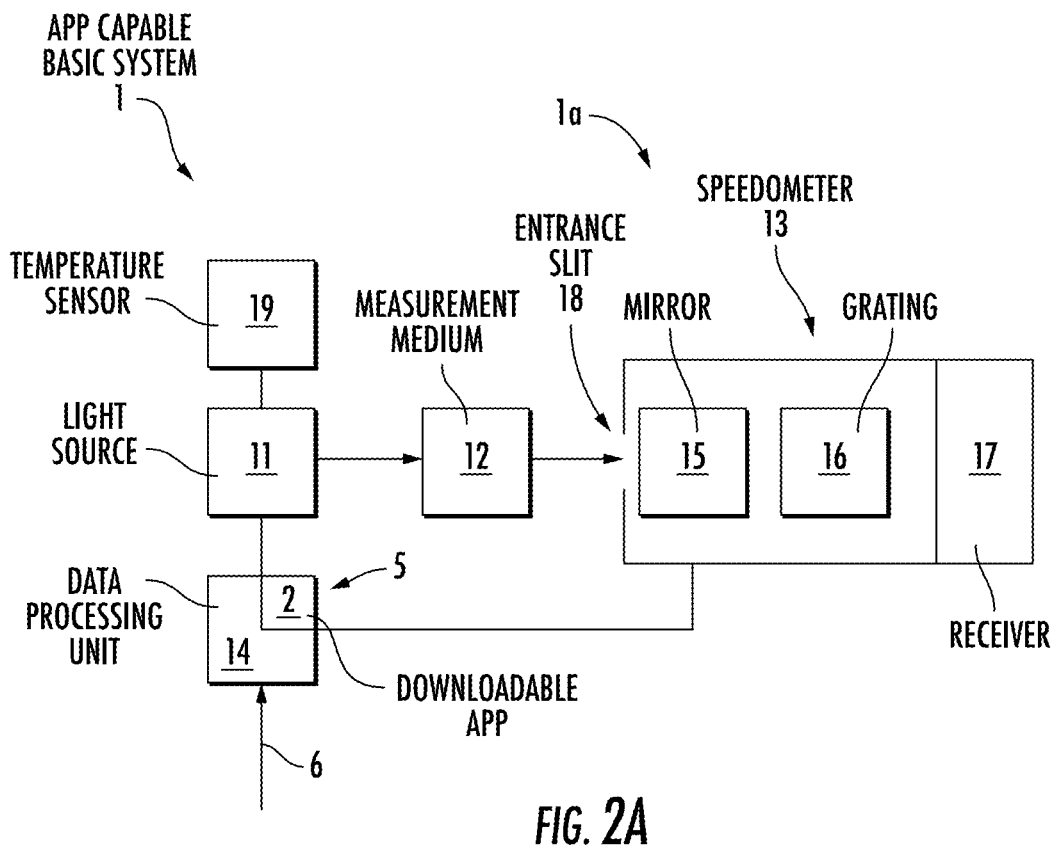
FIG. 2*a-d* show embodiments of the basic system as a sensor or measuring transducer.
Figure 2B:
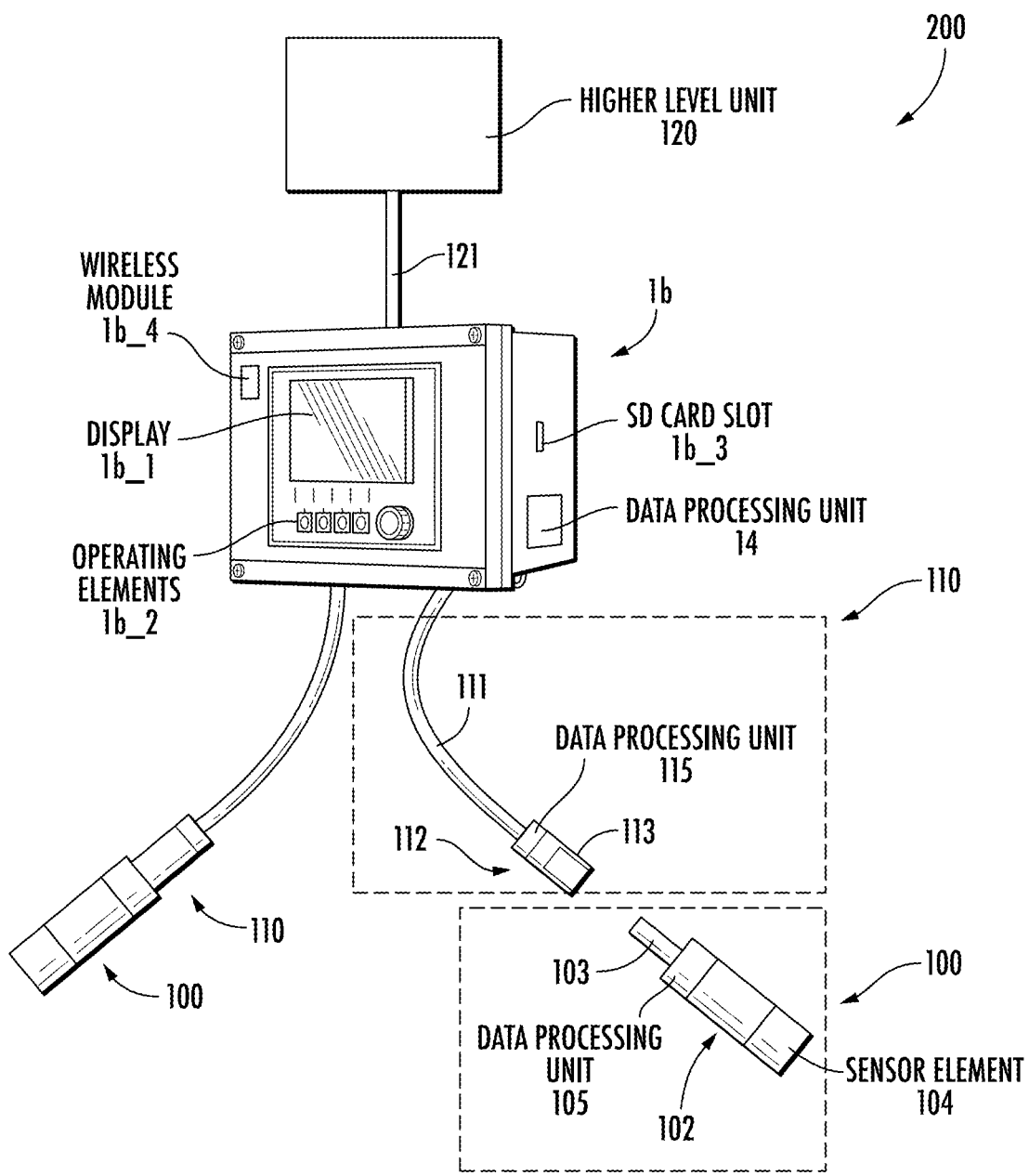
Figure 2C:
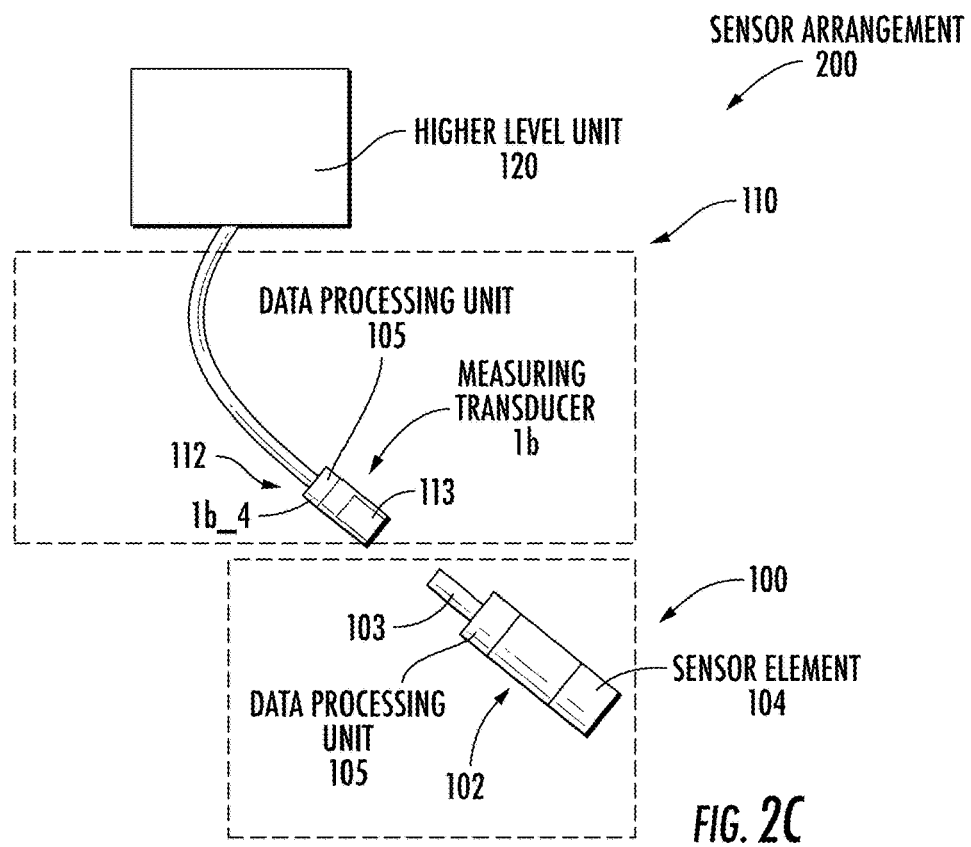
Figure 2D:
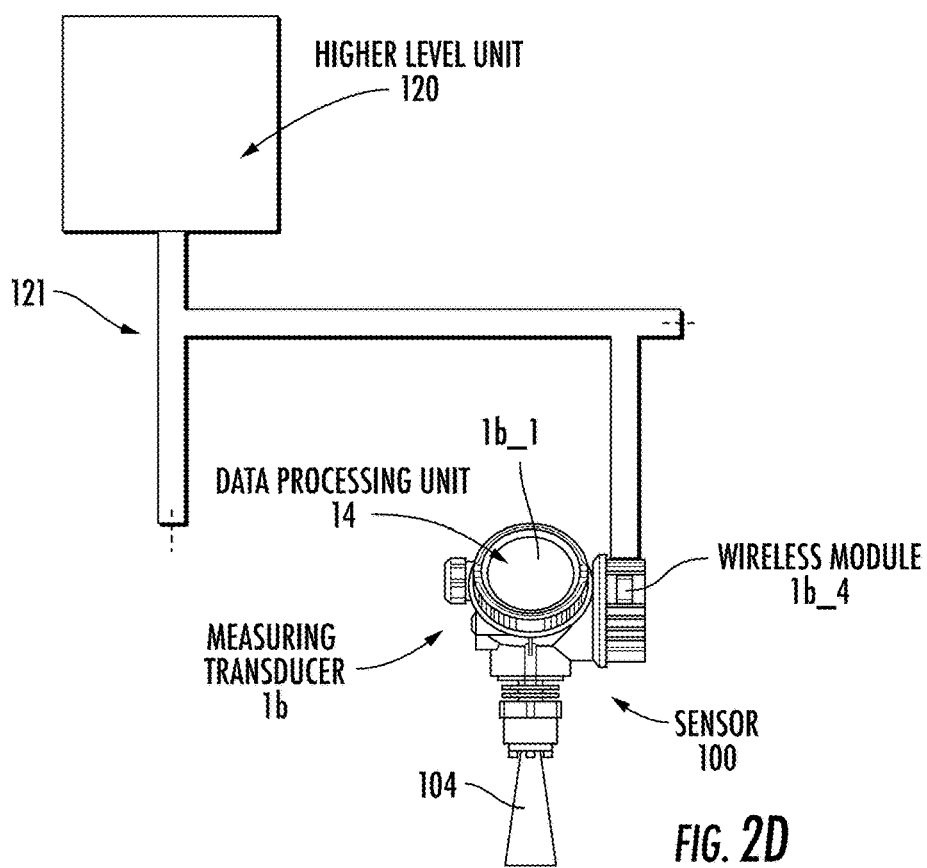

The spectrometer 13 is only shown symbolically in FIG. 2*a* and comprises, for example, at least one beam-shaping element, for example a mirror 15, a grating 16 (in general, a dispersive element, for example also a prism) and a receiver 17. Mirror 15 and grating 16 can be configured as a single component. The receiver is configured as a CCD sensor or linear array detector. At the entrance of the spectrometer 13 is an entrance slit 18. In principle, the idea according to the present disclosure works for all spectrometric measuring systems, irrespective of whether a prism or grating is used, for instance.

Light from the light source 11, which is configured, for example, as a xenon flash lamp, is transmitted from the light source 11 in the direction of the measurement medium 12. The light source 11 can also be designed as an LED. If the emission spectrum of the light source 11 is temperature-dependent, the sensor 1a comprises a temperature sensor 19 which is arranged at, in, or at least close to the light source 1. The emission spectrum can thereby be corrected with respect to the temperature if necessary.

A transmission measurement is shown. For this purpose, the light source 11 comprises one or more windows which are at least partially transparent to the emitted light. The measurement medium 12 is separated from the optical and electronic components of the sensor 1 by the windows. Other measuring principles such as absorption measurement, scattering measurement or fluorescence measurement are also possible.

The embodiment of the basic system 1 as measuring transducer 1b will be discussed below. This is shown in FIG. 2b, FIG. 2c and FIG. 2d.

Generally speaking, a measuring transducer 1b, also called a transmitter, is a device that converts an input variable into an output variable according to a fixed relationship.

The measuring transducer 1b is used in a so-called sensor arrangement 200. The sensor arrangement 200 therefore comprises at least the measuring transducer 1b and a sensor 100. In contrast to the sensor 1a from FIG. 2a, the sensor 100 mentioned in FIG. 2b-d is, for example, not able to independently carry out complicated computing operations for reasons of energy supply, storage capacity, computing power, arrangement or type; for example the sensor 100 mentioned in FIG. 2b-d is not able to generate measured values from raw values using a model. In order to differentiate the "sensor" in FIG. 2a, the reference signs in FIG. 2b-d are three-digit; the sensor is marked with the reference sign "100" unless it is explicitly the same as in FIG. 2a.

FIG. 2b-d show three different embodiments of the measuring transducer 1b with a sensor 100. In FIG. 2b, the measuring transducer 1b is connected by a cable 111 to the sensor 100; in FIG. 2c, the measuring transducer 1b is integrated in the cable 111 while this is also connected to the sensor 100; in FIG. 2d, the measuring transducer 1b and sensor 100 form a unit. This will be further explained in the following.

Common to the three embodiments in FIG. 2b-d is that the raw measured values of the sensor 100 are processed in the measuring transducer 1b, e.g., averaged and/or converted by means of a calibration model to another variable, for example, the process variable to be determined, and possibly transmitted, to a control system, for example.

First, FIG. 2b:

According to FIG. 2b, the sensor 100 comprises a first physical interface 103 by means of which the sensor 100 is connected to the measuring transducer 1b and thereby exchanges data (bidirectionally) and is supplied with energy (unidirectionally). The cable 111 is part of a connection element 110 which can be connected at one end to the measuring transducer 1b and at the other end to the sensor 100. At the sensor-side end, the cable 111 has a second physical interface 113 complementary to the first physical interface 103. The physical interfaces 103, 113 are designed for instance as electrically isolated, such as inductive, interfaces. The physical interfaces 103, 113 can be coupled to each other by means of a mechanical plug connection. The mechanical plug connection is hermetically sealed, such that no fluid, such as the medium to be measured, air, or dust can enter from the outside.

The sensor 100 comprises at least one sensor element 104 for detecting a measurand of process automation. The sensor 100 is then for example a pH sensor, also known as ISFET, generally an ion-selective sensor, a sensor for measuring the redox potential, from the absorption of electromagnetic waves in the medium, for example with wavelengths in the UV, IR and/or visible ranges, of oxygen, conductivity, turbidity, the concentration of non-metallic materials, or temperature with the particular measurand.

The sensor 100 comprises a first coupling body 102, which comprises the first physical interface 103. The connection element 110 comprises a second, cylindrical coupling body 112 that is designed to be complementary to the first coupling body 102 and can be slipped with a sleeve-like end portion onto the first coupling body 102, wherein the second physical interface 113 is plugged into the first physical interface 103.

The sensor 100 comprises a data processing unit 105, such as a microcontroller, which processes the values of the measurand, for example converts them into a different data format. The data processing unit 105 is designed for energy and space reasons to be rather small or economical with respect to the computing capacity and the memory volume. The sensor 100 is therefore designed only for "simple" computing operations, such as, for example, for averaging, preprocessing, and digital conversion. The data processing unit 105 converts the value that depends upon the measurand (i.e., the measurement signal of the sensor element 104) into a protocol that the measuring transducer 1b can understand.

The connection element 110 can likewise comprise a data processing unit 115. The data processing unit 105 is also designed to be "small" and can serve as a repeater for the data.

Several sensors 100 can also be connected to a measuring transducer 1b. Shown in FIG. 2b are two sensors 100, wherein only one of the two is provided with all of the reference symbols. The same or different sensors can be connected. The left one of the two is shown in the plugged-in state. For example, up to eight sensors may be connected to the measuring transducer 1b.

The measuring transducer 1b is connected to a higher-level unit 120, such as a control system, by a cable 121. The measuring transducer 1b forwards the measurement data via the cable 121 to a control system 120. The control system 120 is in this case designed as a process control system (PLC), PC, or server. For this purpose, the measuring transducer 1b converts the data into a data format that the control system can understand, for instance in a corresponding bus, such as HART, Profibus PA, Profibus DP, Foundation Fieldbus, Modbus RS485, or else an Ethernet-based field bus, such as EtherNet/IP, Profinet, or Modbus/TCP.

The measuring transducer 1b comprises a display 1b_1 and one or more operating elements 1b_2, such as buttons or rotary knobs, by means of which the measuring transducer 1b can be operated. For example, measurement data of the sensor 100 or the information of the app 2 are displayed by the display 1b_1. The sensor 100 can also be configured and parameterized by means of the operating elements 1b_2 and the corresponding view on the display 1b_1. The measuring transducer 1b comprises the data processing unit 14. Likewise, the measuring transducer 1b can comprise an SD card slot 1b_3 via which apps 2 can be uploaded to the measuring transducer 1b. The measuring transducer 1b can also comprise one or more wireless modules 1b_4, such as Bluetooth, mobile radio (2G, 3G, 4G, 5G) or other, possibly also wireless bus protocols such as WirelessHART.

FIG. 2c represents a second embodiment of a sensor arrangement 110. In this case, only exactly one sensor 100 is connected to a measuring transducer 1b. The measuring transducer 1b is in this case illustrated only symbolically, is smaller in its dimensions than the measuring transducer from FIG. 2b, and is approximately the size of a matchbox. The measuring transducer 1b can in this case be designed as a separate unit that can be connected to the cable or, as shown here, be integrated directly into the cable. The measuring transducer 1b therefore consists substantially of the data processing unit 105. The measuring transducer 1b does not comprise a display and has, if any, only one or two operating elements, which are configured for a reset or for turning on and off. In this embodiment, the measuring transducer 1b preferably comprises no operating elements. The measuring transducer 1b therefore comprises a wireless module 1b_4, such as a Bluetooth module, with the protocol stack Bluetooth Low Energy. A mobile device (not shown), such as a cellphone, tablet, laptop, etc., can thereby be wirelessly connected to the measuring transducer 1b. By means of the mobile device, the sensor 100 can be configured and parameterized using the wireless connection via the wireless module 1b_4. It is also possible for an app 2 to be uploaded to the measuring transducer 1b in this way. The measuring transducers in FIG. 2b and FIG. 2c have substantially the same basic functionality.

The embodiment of the measuring transducer 1b in FIG. 2d differs therefrom. Sensor 100 and measuring transducer 1b are not connected to one another via a cable, and the measuring transducer is not part of the cable. Instead, sensor 100 and measuring transducer 1b form a unit. FIG. 2d shows a fill level sensor according to the radar principle. Further principles for the fill level are guided and freely radiating radar, as well as ultrasound, also for detection of limit level, wherein capacitive methods can also be used to detect the limit level. Further possible sensors for this embodiment are flow sensors according to the Coriolis, magnetic induction, vortex, and ultrasound principles.

In general, it can be said that the sensor 1a from FIG. 2a is equipped with more powerful components (memory, microcontrollers, . . . ) than the sensor 100 from FIG. 2b-d. In the embodiment of FIG. 2b-d, the measuring transducer 1b assumes most of the computing tasks. In principle, however, a sensor 1a can also be connected to a measuring transducer 1b.

No matter how the basic system 1 is designed, the idea according to the present disclosure is to extend the functionality via one or more apps 2. Depending on the embodiment, this takes place in the sensor, in the measuring transducer, or in both.

The data processing unit 14 of the basic system 1 (whether it is configured as a sensor 1a or as a measuring transducer 1b) comprises one or more apps 2, represented by the square box. The apps 2 are located in the memory 5. If the apps 2 are not yet in the memory 5, the app 2 is uploaded to it. This is done, for example, via the communication interface 6. Depending on the embodiment of the basic system 1, the apps 2 can also be directly transmitted to the basic system 1, for example via a wireless data connection such as Bluetooth or the like. Likewise, the apps 2 can be loaded via a memory card, for example an SD card, into the data processing unit 14 if the basic system 1 comprises such a possibility; this is the case in the embodiment of the basic system 1 as a measuring transducer 1b.

Before the process of creating the app-capable basic system 1 is discussed, the app 2 per se shall be explained.

The app 2 comprises at least program code and metainformation 21, wherein the metainformation 21 comprises at least the name and version of the app 2, the target system of the app 2, the name and version of expected system calls 24a, and the name and version of offered interface methods 22. The app 2 is present, for example, as an image file in which the actual program code and the identification feature 21 (metainformation) of the app 2 itself are located.

Figure 3A:
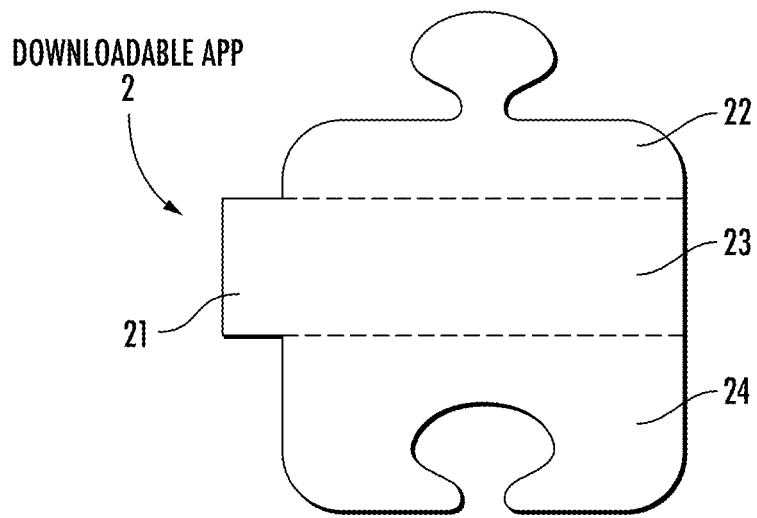
FIG. 3*a/b* show the app.

This is also shown by the general representation of the app 2 in FIG. 3a. The program code comprises three parts: the actual main logic 23, one or more interface methods 22 which are called by the basic system 1, and one or more system call stubs 24, by means of which functions in the basic system 1 are called.

An app 2 is only capable of running on a basic system 1 when the app 2 offers the interface methods 22 that the basic system 1 expects, and the basic system 1 offers the system calls 24a that the app 2 expects.

Interface methods 22 and system calls 24a represent interfaces between the app 2 and the basic system 1. Since these are intended to be expandable over time in a downward compatible manner, the interfaces must be versioned.

The interface methods 22 and the system calls 24a are not part of the metainformation 21. These are components of the code of the basic system 1. The interface methods 22 and the system calls 24a describe things to which the metainformation 21 may refer.

The metainformation 21 which the basic system 1 evaluates before an app 2 is loaded is stored in the app 2. FIG. 6 shows an example of such metainformation 21. In the following, the example of content of the metainformation 21 will be explained in parentheses and in italics.

Based on this information, the basic system 1 can decide whether the app 2 has been written for the basic system 1 (softlwareClass; the app framework in the firmware refuses to run apps that are incompatible), the version (version) of the app 2, whether the basic system 1 offers all system calls 24a expected by the app 2 in a compatible version (depends, version), and whether the app 2 offers all the interface methods 22 expected by the basic system 1 in a compatible version (provides, version).

Metainformation 21 usually comprises the manufacturer (manufacturer) of the app 2, a description (description) for a brief explanation of the app 2, a creation date (timestampUTCMs), a unique name (uniqueName) and a better readable name (friendlyName), for example for being shown on a display of the basic system.

In addition to the mentioned metainformation 21, this can comprise: maximum memory requirements of the app 2 (optionally separately according to heap and stack), required memory requirement of the app 2 (optionally separately according to heap and stack), the required computation requirement of the app 2, or a time budget for the interface method 22. The apps 2 can therefore specify a soft limit for heap and stack requirements, and the basic system 1 can set hard limits for the total memory requirement per app. Further metainformation 21 can comprise properties of the basic system 1 which the app 2 expects from the basic system 1, such as the presence of components, peripheral devices or terminals, such as a display, control buttons, Ethernet, Bluetooth, inter alia. Finally, the metadata lists the interfaces and components on which it depends, and which interfaces it provides (see last and penultimate section). Not all mentioned metainformation is shown in FIG. 6. The metainformation 21 is present, for example, as an XML, file.

If a time budget for the interface method 22 is established, the basic system 1 (or the generated interface stub 22a) therefore knows when an app 2 is taking too long to run an interface method 22 and can be aborted. The basic system 1 can therefore protect against unintentional endless looping in the app 2 which would otherwise crash the entire system. The same applies if the memory requirement or computation requirement is exceeded.

The code of the app 2 can consist of any algorithms.

The main logic 23 for a sensor 1a can be configured for example to convert the raw values of the sensor into measured values. Raw values are the physical parameters such as a voltage value, while the measured value represents for example the fat content of milk or a concentration of a specific substance in the medium to be measured. Interface methods 22 are, for example, entry points for calculating the measured value. System calls 24 are, for example, optimized routines which are frequently used in signal processing algorithms and sensor functions in order to query the current raw values and determine the calculated measured value. The sensor 1a can give the interface method 22 of the app 2 the current raw values as parameters, or the app 2 can query the current raw values of the sensor 1a via an API. The app 2 supplies the measured value, optionally with the particular unit, back to the sensor 1a, for example as a return value or by the sensor offering an API by which the app communicates the current measured value and the unit.

Figure 3B:
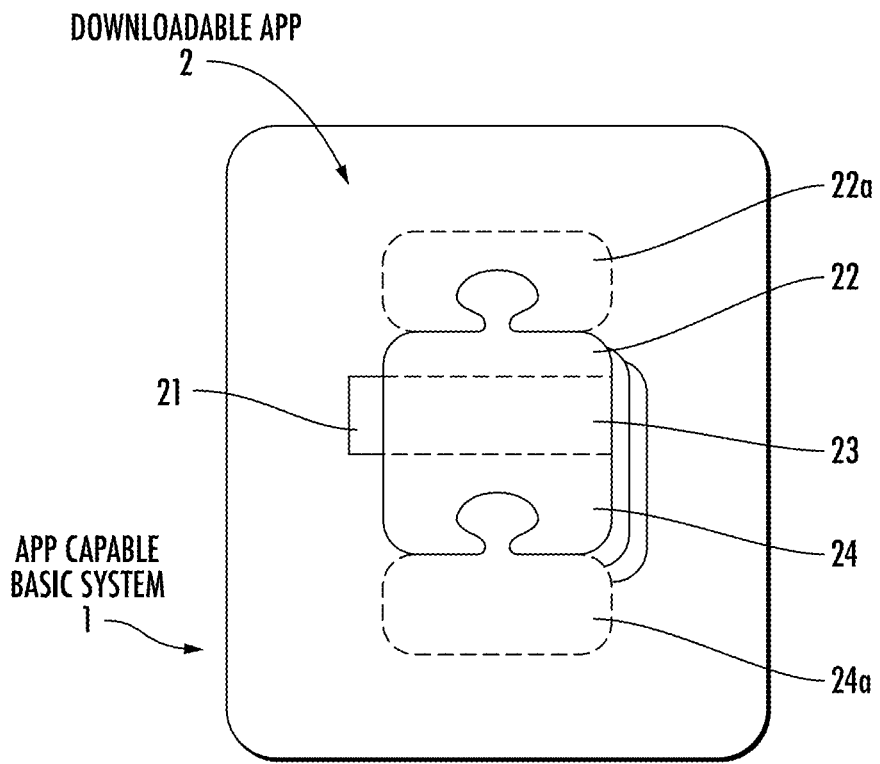

FIG. 3b shows the relationship between the app 2 and basic system 1. A plurality of apps 2 can run simultaneously on the basic system 1. This is illustrated by the puzzle parts lying under each other that are indicated in the middle of the drawing. In the basic system 2 there are interface stubs 22a by means of which the interface methods 22 in the app 2 are called. The basic system 1 offers the app 2 functionalities in the form of system calls 24a. So that an app 2 can call the system calls 24a in the basic system 1, there are corresponding system call stubs 24 in the app 2.

As shown in FIG. 3b, a plurality of apps 2 can be run simultaneously, but all apps 2 for the same type have the same interfaces. In one embodiment, apps 2 run in an isolated environment in order to prevent a defective app 2 from causing the host to crash. Due to this isolation, the basic system 1 cannot directly call a method in the app 2. The app 2 also cannot make direct calls to the basic system 1. Apps 2 also run in their own address space and by default cannot access data of the basic system 1.

Instead, the process runs as shown in. In order to interact with an app 2, there are interface stubs 22a on the sensor side. An app 2 is only "entered and exited" via interface stubs 22a. If the basic system 1 calls a stub 22a, a dispatch mechanism jumps into the app 2 and calls the corresponding interface method 22. The interface methods 22 call the main logic 23 which executes its function and returns. The main logic 23 can also access system calls 24a. In this case, the main logic 23 calls a stub 24, and a dispatch mechanism in turn forwards a system call 24a on the basic system side. Now the execution again occurs in the basic system 1, the system call 24a executes its action, then returns to the app 2, and finally the app 2 returns to the basic system 1. The application code can consist of a main loop so that this cycle can be repeated forever.

Each app-capable firmware of the basic system 1 must specify the interface(s), that is to say, the interface method(s) 22 which must implement apps 2 for this basic system 1. Since interfaces can develop further over time, they are versioned. As shown in FIG. 4 as a code of an interface method 22, an interface specification contains a name (name) for the interface, a version (version), and a list of methods (methods). Each method has a signature (signature) and a unique identifier (id). The identifier can be explicitly designated or issued automatically. Return values are implemented via output reference parameters. A method can optionally have a time budget (timeBudget). If the host calls a method with a time budget, the host terminates the plugin if the method exceeds the budget. Plugin methods without a time budget are run without a time limit.

System calls 24a are implemented on the host 1 and provide functions for the plugins 2. For example, the host 1 can provide methods for reading or writing certain memory areas via system calls 24a. System calls 24a are defined by a versioned interface specification. FIG. 5 shows the structure as a code snippet of a system call interface specification. System calls 24a can be grouped, for example, represented here by group. System calls 24a have a name (such as "CThreadControl" or "CIndexStructureAccess"), a unique identifier (id), and a version (version). The same thing applies for the methods of the system calls 24a per se as for an interface method 22.

An app 2 is therefore only capable of running on a basic system 1 when the app 2 offers the interface methods 22 that the basic system 1 expects and the basic system 1 offers the system calls 24a that the app 2 expects. They must therefore first be created. Interface methods 22 and system calls 24a represent interfaces between the app 2 and the basic system 1. Since these are intended to be expandable over time in a downward compatible manner, the interfaces must be versioned.

As mentioned further above, in the basic system 1, there are interface stubs 22a by means of which the interface methods 22 in the app 2 are called. So that an app 2 can call the system calls 24a, there are corresponding system call stubs 24 in the app 2.

The manual implementation of interface stubs 22a and system call stubs 24 is cumbersome. Manual versioning and ensuring the long-term compatibility of interfaces are prone to errors. Therefore, this is preferably done by an automated process 26. An interface description 25 includes: the interface methods 22 including the version (optionally with a signature) that the basic system 1 expects from an app 1, and the system calls 22a including the version (optionally with a signature) that the basic system 1 offers to an app 2

Figure 7:
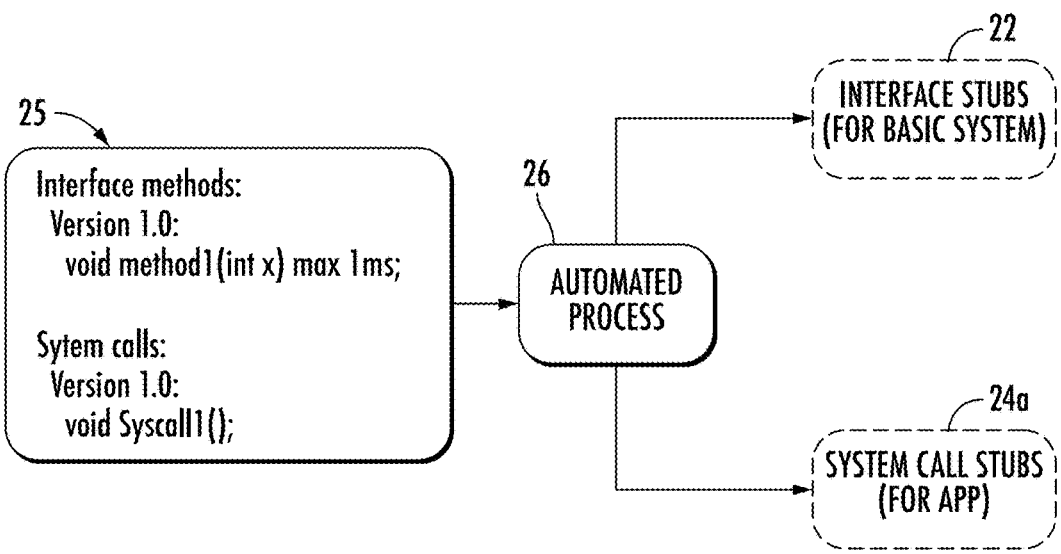
FIG. 7 shows an interface description with the creation process.

In the automated process, the interface description 25 is checked for syntactic and semantic correctness. If the description is error-free, the interface stubs 22a for the basic system 2 and the system call stubs 24 for the app 2 are generated from this interface description 25. This is shown in FIG. 7. As long as the version does not change, the stubs 22a, 24 only need to be generated once. The apps 2 can then reuse these stubs 22a, 24.

The basic system is usually developed further over the product life. Newer versions of the basic system 1 can therefore be supplemented by new system calls 24a, or the basic system 1 can expect additional interface methods 22 from apps 2. Accordingly, the interface description is also to be expanded. In this case, compatible expansions are generally a requirement.

Figure 8:
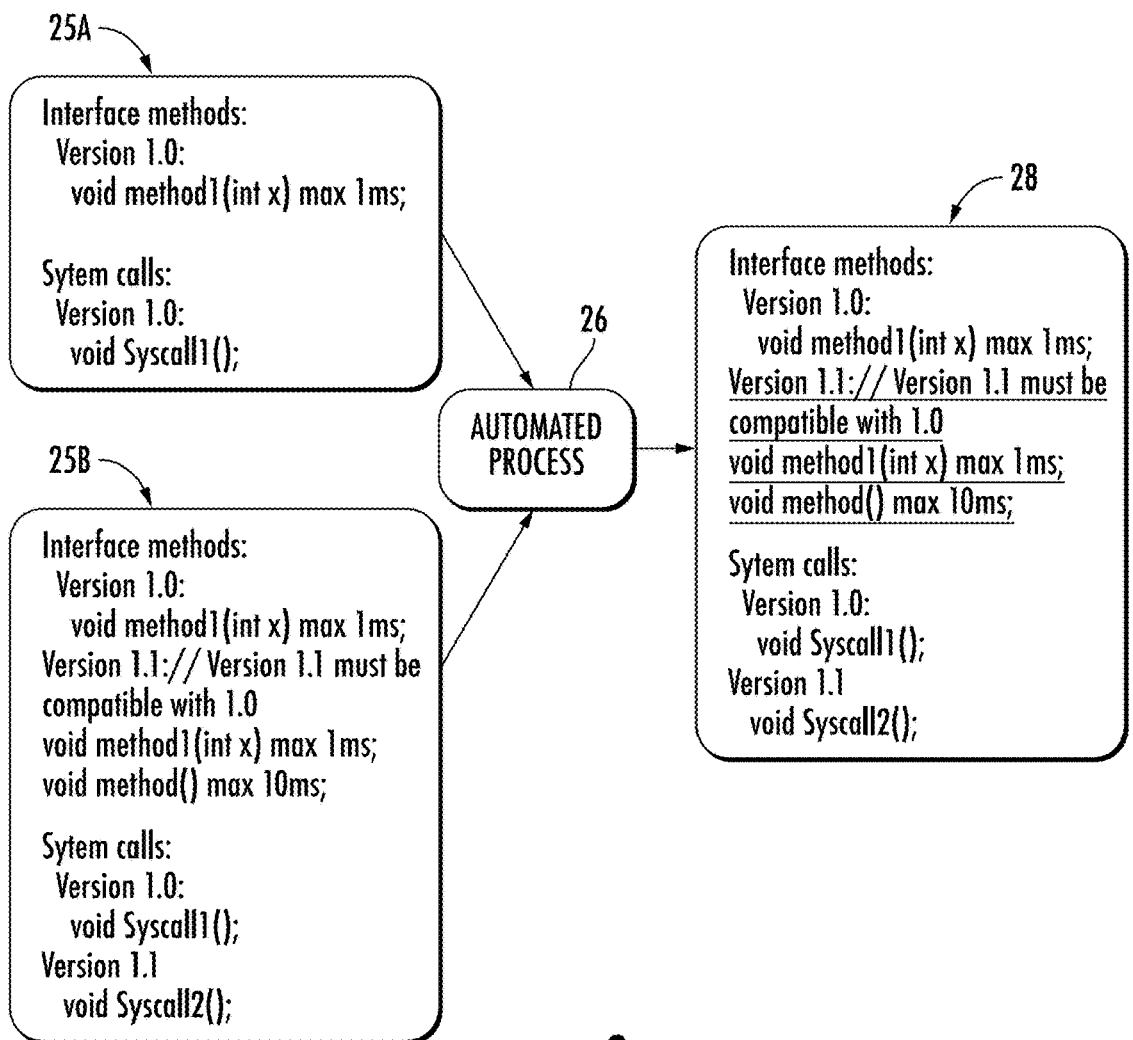
FIG. 8 shows before/after variants of interface descriptions.

FIG. 8 shows a possibility of comparing before/after variants of interface descriptions. Let us assume that the basic system 1 is already on the market in the version A with the interface description 25A. The version B with the interface description 25B, which has been expanded for compatible expansions for the apps 2, is supposed to be published later. It should therefore be ensured that the interface description for version B only consists of compatible expansions to the description of version A. For this purpose, the interface description 25A of the previous version is compared with the interface description 25B of the future version, and, for example, a (machine evaluable) report 28 is created as to whether the two descriptions are compatible. The machine evaluability makes it possible for the compatibility tests to be carried out in an automated manner in the basic system 1 creation process, and for the creation process to be terminated if there are incompatibilities. In the example shown here, the new system call 24a of version B is incompatible with the older version A. The reason is that the call Syscall 1 is missing.

FIG. 7 shows that stubs or their code are generated. In a first embodiment, the resulting code structures are permanently programmed directly in the process 26. However, since the generated stubs must fit the app 2 and basic system 1, this approach results in problems; for example when the software architecture of the basic system 1 changes, the generated stubs no longer fit the basic system; and for each new basic system, a complicated adaptation of the process is necessary.

Therefore, the stub code structures being generated by the process 26 are transferred into templates (reference signs 27A, 27B, 27C). These templates or template sets are template-like code structures that the process 26 fills with the content from the interface description 25. If stubs are then to be generated, the process 26 receives the following information: the interface description 25, and a template set with stub code structures which fit the target system.

In order to support a new combination of the basic system 1 and app 2 (e.g. a new measuring transducer 1b, the code basis of which differs from previous ones, or which has been implemented in another programming language), only a new template set needs to be implemented.

Figure 9A:
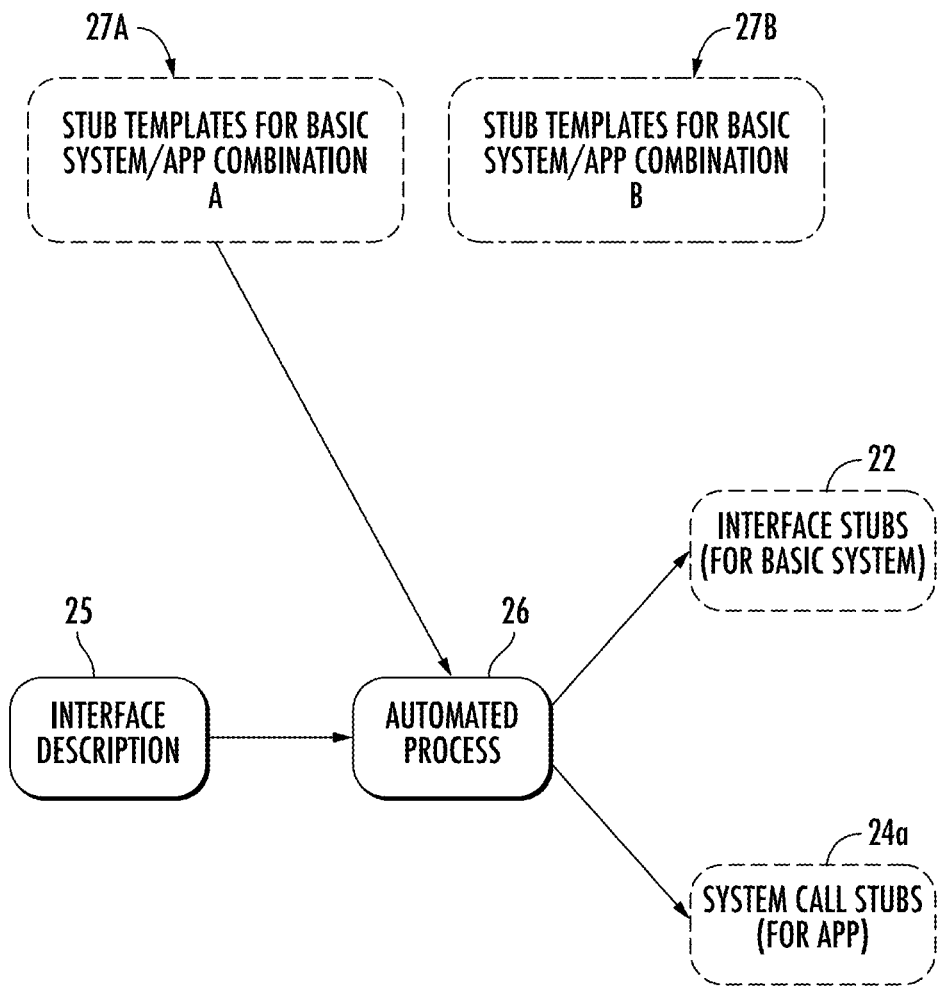
FIG. 9*a-c* show stub templates for different basic system-app combinations.
Figure 9B:
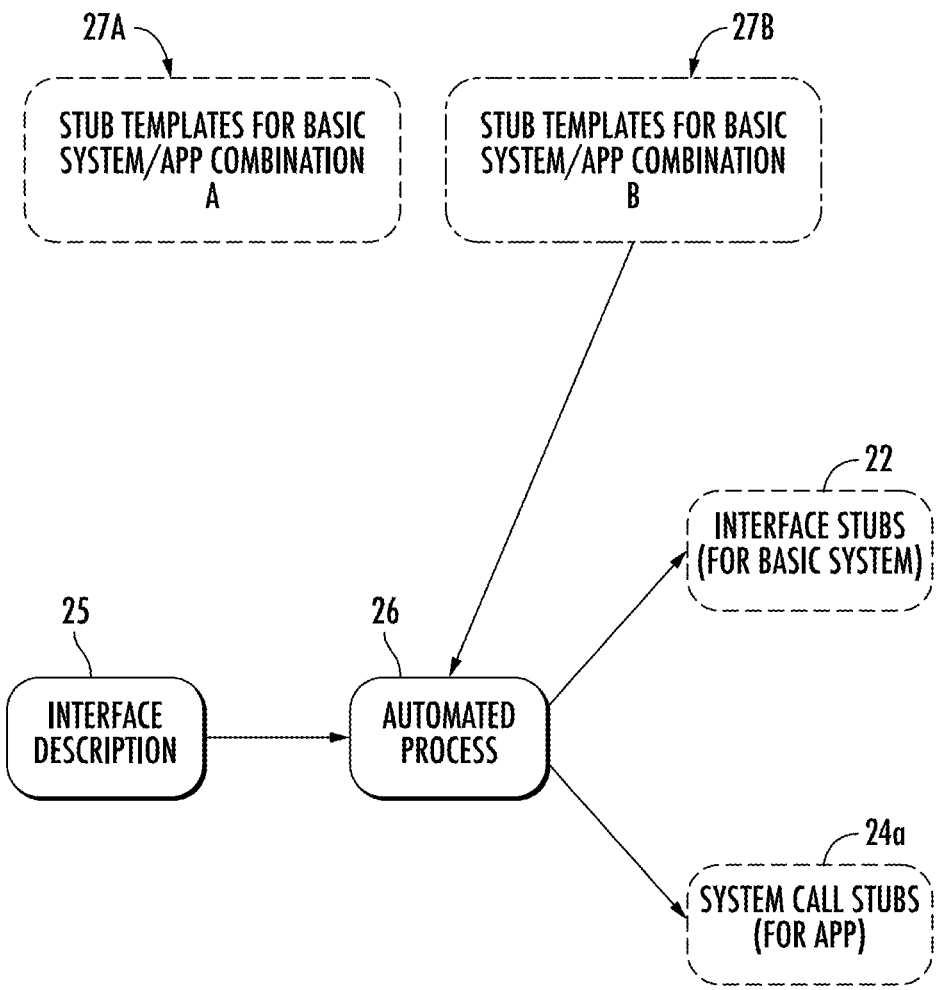
Figure 9C:
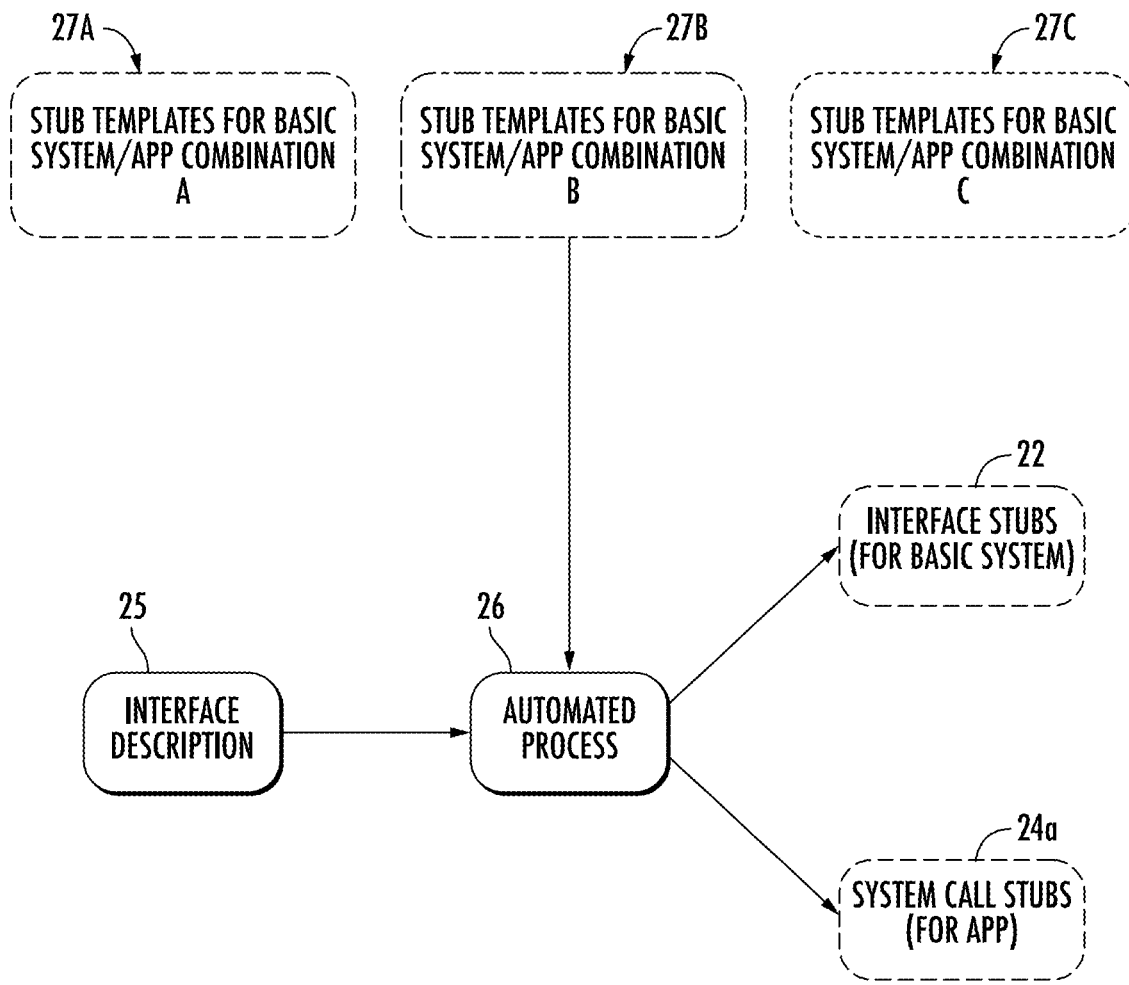

FIGS. 9a and 9b show the stub templates in various combinations of the basic system 1 and app 2, which are identified with reference numbers 27A and 27B. Depending on the combination, another template can be selected. FIG. 9c shows a simple expansion for another combination—in this case, a new template 27C is created specifically for this combination.

Finally, the basic system 1 is created from the system calls (24a) and the interface stubs (22a).

The app 2 is finally created from the interface methods 22, the system call stubs 24, and the main logic 23. This occurs, for example, by creating program code, which is subsequently compiled or interpreted. Creation is done either manually or also by an automated process. The app 2 consists of program code and the metainformation 21.

The sensor 1 must be able to load and run apps 2, for example in that the sensor firmware implements a virtual machine in which apps 2 are interpreted/run. The virtual machine is designed as an interpreter, such as an emulator, as an ahead-of-time compiler, just-in-time compiler, hypervisor, or a combination thereof. However, the app 2 can also be run "natively" on the basic system 1. For this purpose, the basic system 1 comprises for example an ahead-of-time compiler or a just-in-time compiler. The app 2 is present in a corresponding format on the basic system 1. For apps 2 to be interpreted/run, the app 2 must contain program code that is interpretable/runnable or can be converted into an interpretable/runnable form, for example machine-independent byte code. Likewise, the program must be stored in a binary format, for example in the executable and linking format (ELF). The binary format provides information about the memory layout of the app, e.g. the position and size of the code and data. This information is necessary for loading an app 2 and for preparing it to run.

Figure 10:
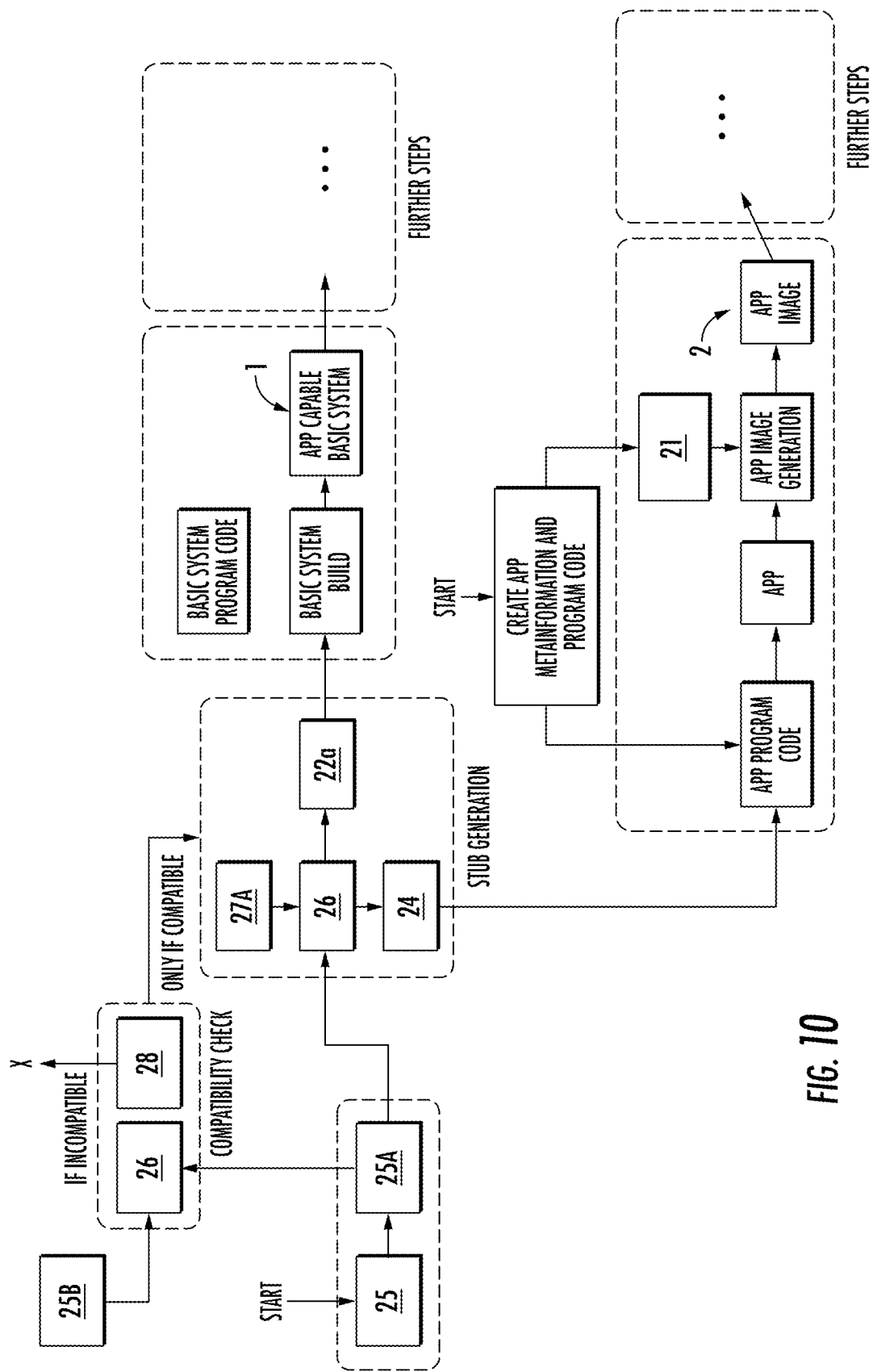
FIG. 10 schematically shows the creation of an app-capable basic system and a matching app.

FIG. 10 shows the creation of an app-capable basic system 1, such as an app-capable measuring transducer 1b or an app-capable sensor 1a, and a matching app 2. Proceeding from the interface description 25, there is a compatibility check as to whether the different versions 25A, 25B are compatible with one another, and a report 28 is optionally created. This is done by an (automated) process 26. If the compatibility check is successful, the stubs are created with the templates (here template 27A) starting from the interface description 25, optionally also by an (automated) process 26. On the one hand, the basic system 1 is created therefrom, or the firmware image is created. On the other hand, when the basic system 1 is finished, the app 2 is created via the program code and the metainformation 21.

The invention claimed is:

1. A method for creating an app-capable basic system and a matching app, comprising the steps of:
    creating one or more interface methods with their name and version that the basic system expects from the app;
    creating one or more system calls with their name and version that the basic system offers the app;
    checking the one or more interface methods and the one or more system calls for syntactic and semantic correctness;
    creating interface stubs for the basic system using the one or more interface methods;
    creating system call stubs for the app using the one or more system calls;
    creating the basic system by means of the one or more system calls and interface stubs; and
    creating the app by means of the one or more interface methods and the system call stubs.

2. The method according to claim 1, further comprising:
    creating a stub template set for the basic system and the app prior to the creating the interface stubs and the creating the system call stubs; and
    wherein the creating the interface stubs and the creating the system call stubs are performed by the stub template set.

3. The method according to claim 1, further comprising:
    checking whether new versions to be created are compatible with previous versions after the creating the one or more interface methods and the creating the one or more system calls.

4. The method according to claim 1, wherein the creating the basic system and the creating app take place by an automated process.

5. The method according to claim 1,
    wherein the app comprises at least program code and metainformation;
    wherein the program code comprises
        a main logic,
        the one or more interface methods which are called by the basic system, and
        the system call stubs based on which functions in the basic system are called; and
    wherein the metainformation comprises
        a name and a version of the app,
        a target system of the app,
        a name and aversion of expected system calls, and
        a name and a version of offered interface methods.

6. The method according to claim 1, wherein the metainformation comprises:
maximum memory requirement of the app;
required memory requirement of the app;
required computation requirement of the app;
time budget of the one or more interface methods; or
properties of the basic system that the app expects from the basic system.

7. The method according to claim 1, further comprising:
returning at least one return value from the app to the basic system for the one or more interface method; or
returning at least one return value from the basic system to the app via the one or more system calls.

8. The method according to claim 1,
wherein the basic system comprises a plurality of apps.

9. The method according to claim 1,
wherein the basic system is a sensor and the app is for calculating a measured value using a model;
wherein the sensor transmits a raw value as a parameter to the app, or the app retrieves the raw value via an application programming interface (API);
wherein main logic comprises algorithms for signal processing and routines for calculating the measured value from a raw value using the model; and
wherein the measured value is a return value.

10. A sensor for executing the method of claim 1, comprising:
a sensor element for detecting a measurand of a measurement medium; and
a data processing unit with a memory.

11. The sensor according to claim 10,
wherein the sensor is designed as an optical sensor with a light source and a light receiver;
or the sensor is a spectrometer.

12. A measuring transducer for executing the method of claim 1, comprising a data processing unit with a memory.

* * * * *